US010375463B1

(12) United States Patent
Kocubinski et al.

(10) Patent No.: US 10,375,463 B1
(45) Date of Patent: Aug. 6, 2019

(54) WIRELESS PERSONAL ACOUSTIC DEVICE WITH REMOTE COAXIAL ANTENNA

(71) Applicant: Bose Corporation, Framingham, MA (US)

(72) Inventors: Laura Kocubinski, Allston, MA (US); Mari Shakthi Muthuswamy, Newton, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/963,650

(22) Filed: Apr. 26, 2018

(51) Int. Cl.
*H04R 1/10* (2006.01)
*H04W 4/80* (2018.01)

(52) U.S. Cl.
CPC ......... *H04R 1/1041* (2013.01); *H04R 1/1016* (2013.01); *H04R 2420/07* (2013.01); *H04W 4/80* (2018.02)

(58) Field of Classification Search
CPC .......... H04Q 1/242; H04Q 1/273; H04Q 1/46; H04M 1/05; H04M 1/6058; H04R 1/1033; H04R 5/0335; H04R 2420/07; H04R 1/10
USPC ............................................ 381/74, 380, 80
See application file for complete search history.

(56) References Cited

U.S. PATENT DOCUMENTS

| 9,866,946 | B2 | 1/2018 | Chen et al. | |
|---|---|---|---|---|
| 2004/0256188 | A1* | 12/2004 | Harcourt | B65H 75/4428 191/12.2 A |
| 2007/0105438 | A1* | 5/2007 | Yoshino | H01Q 1/273 439/578 |
| 2010/0141538 | A1* | 6/2010 | Yoshino | H04R 5/033 343/702 |
| 2015/0011273 | A1 | 1/2015 | Wilmhoff et al. | |
| 2015/0055020 | A1* | 2/2015 | Yoshino | G06F 13/385 348/706 |
| 2017/0078779 | A1* | 3/2017 | Hamparson | A45F 5/00 |
| 2017/0257692 | A1* | 9/2017 | Yang | H04R 1/1041 |
| 2018/0041617 | A1* | 2/2018 | Shamsoddini | H01Q 9/42 |

* cited by examiner

*Primary Examiner* — Melur Ramakrishnaiah
(74) *Attorney, Agent, or Firm* — Schmeiser, Olsen & Watts LLP; William G. Guerin

(57) ABSTRACT

Described is a personal acoustic device that includes at least one earphone, such as an earbud, and a radio frequency (RF) antenna module in electrical communication with a wireless transceiver module inside the earphone to support wireless communication between the device and a remote wireless device. The RF antenna module includes an antenna element disposed in or on a remote housing and further includes an RF coaxial cable having one end in electrical communication with the antenna element and an opposite end in communication with the wireless transceiver module. Improved transmission and reception performance are achieved through increased separation of the antenna module from a user's head and body as compared to an antenna element disposed in the earphone. In addition, the size of the earphone can be reduced relative to an earphone having an antenna element.

18 Claims, 5 Drawing Sheets

WIRELESS PERSONAL ACOUSTIC DEVICE WITH REMOTE COAXIAL ANTENNA

BACKGROUND

This disclosure relates generally to an antenna for a wireless headset. More specifically, to an antenna module that includes a flexible coaxial cable that extends at one end from a headphone and an antenna element disposed at the other end of the flexible coaxial cable.

SUMMARY

In one aspect, a personal acoustic device includes an earphone, a wireless transceiver module and a radio frequency (RF) antenna module. The earphone has an acoustic transducer and the wireless transceiver module is disposed in the earphone. The RF antenna module is in electrical communication with the wireless transceiver module and includes an antenna element and an RF coaxial conductor. The antenna element is disposed at a housing that is remote to the earphone. The RF coaxial conductor has a first end in electrical communication with the antenna element and a second end in electrical communication with the wireless transceiver module. The RF antenna module is configured to receive a wireless signal incident at the antenna element and the RF coaxial conductor, and to transmit a wireless signal from the antenna element and the RF coaxial conductor.

Examples may include one or more of the following features:

The personal acoustic device may further include the housing with a user interface disposed in the housing, wherein the housing is disposed at the first end of the RF coaxial conductor. The antenna element may be disposed inside the housing or on a surface of the housing. The personal acoustic device may further include a cable extending between the housing and the earphone, and the cable may have a jacket enclosing at least one electrical conductor and the RF coaxial conductor. The at least one electrical conductor may include at least one of a power conductor, a ground conductor, a microphone coaxial conductor and a twisted pair conductor.

The antenna element may be a monopole antenna or a loop antenna. The antenna element may be formed on a printed circuit board. The printed circuit board may be a flexible printed circuit board.

The earphone may be an earbud configured for insertion into an ear canal of a user.

The wireless transceiver module may be a Bluetooth transceiver module.

In accordance with another aspect, a personal acoustic system includes an earphone, a wireless transceiver module, an RF antenna module and an audio source device. The earphone has an acoustic transducer and the wireless transceiver module is disposed in the earphone. The RF antenna module is in electrical communication with the wireless transceiver module and includes an antenna element and an RF coaxial conductor. The antenna element is disposed at a housing that is remote to the earphone. The RF coaxial conductor has a first end in electrical communication with the antenna element and a second end in electrical communication with the wireless transceiver module. The RF antenna module is configured to receive a wireless signal incident at the antenna element and the RF coaxial conductor, and to transmit a wireless signal from the antenna element and the RF coaxial conductor. The audio source device is configured for wireless communication with the wireless transceiver module.

Examples may include one or more of the following features:

The audio source may be one of a cellular telephone, smartphone, tablet, personal computer and music playback device.

The personal acoustic system may further include the housing with a user interface module disposed therein, the housing being disposed at the first end of the RF coaxial conductor. The antenna element may be disposed inside the housing or on a surface of the housing. The personal acoustic system may further include a cable extending between the housing and the earbud, the cable having a jacket enclosing at least one electrical conductor and the RF coaxial conductor.

BRIEF DESCRIPTION OF THE DRAWINGS

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Figure 1:
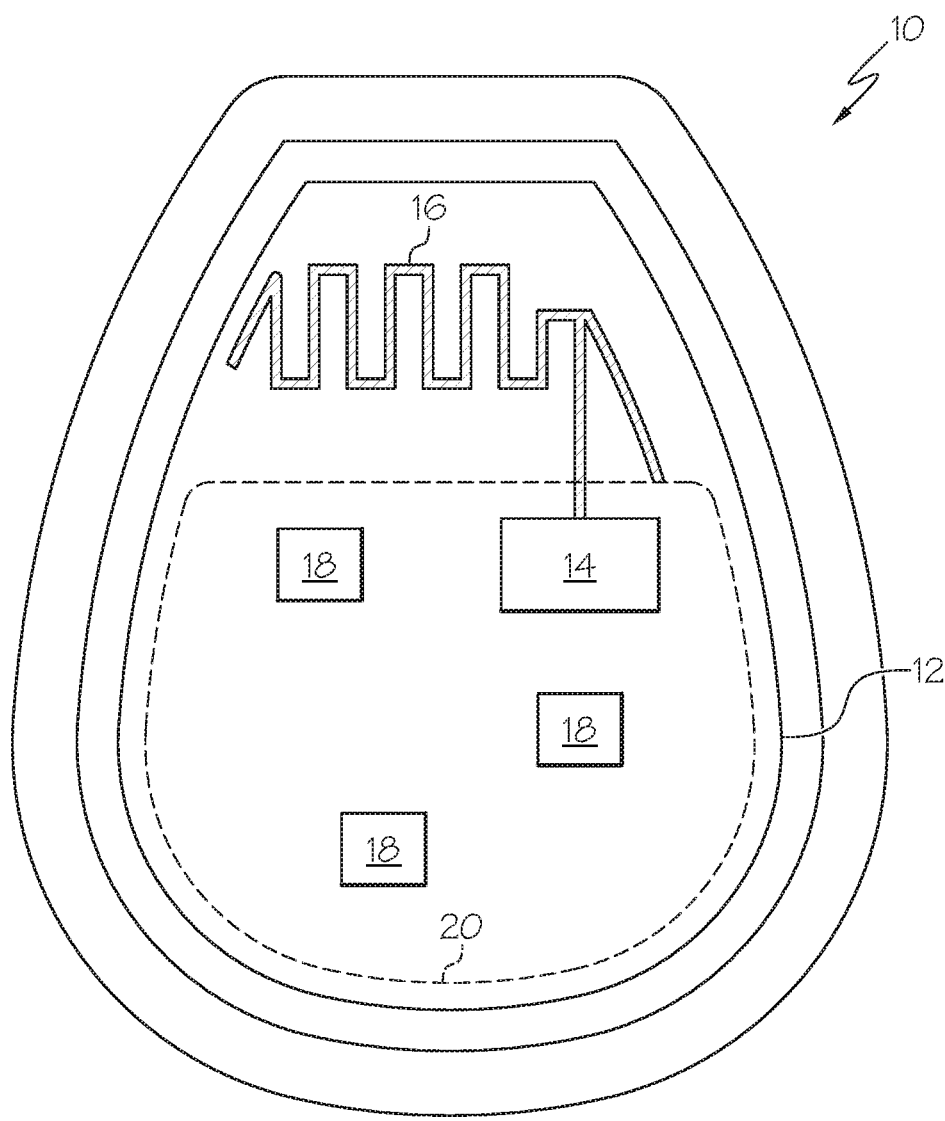
FIG. 1 is a simplified illustration depicting a cutaway view of an earbud showing a printed circuit board (PCB) having an antenna element for wireless communication.

Personal acoustic systems can include headsets having one or more earphones having an acoustic driver to provide an acoustic signal to the ear canal of a user. The headset may be configured for wireless communications. For example, the headset may communicate with a remote device, such as an audio source device, through a wireless communications link. The headset may include additional components, such as a microphone, to enable two-way voice communications supported by the remote wireless device. For example, the remote device may be a cellular telephone, smartphone, tablet, personal computer (PC) such as a laptop, music playback device or other device having a compatible wireless communications capability. The remote wireless device may include a media player for music, may be configured to support telephonic communications, and/or may be configured to provide other acoustic signals to the user.

As used herein, a personal acoustic device means a device in which at least a portion of the device (e.g., an earbud) is structured to allow positioning in, over, around, or near at least one ear of a user. The personal acoustic devices described herein generally include one or more earbuds although it will be recognized that other types of earphones, such as earcups, may be used.

Personal acoustic devices may be configured to communicate with another wireless communications device that may be in a remote location, such as a pocket of the user or otherwise separate from the user but within range to permit wireless communications. In personal acoustic devices having earbuds, there may be a cable or other wired connection between the earbuds. At least one of the earbuds may have a wireless transceiver module for communicating with another wireless device using, for example, Bluetooth °, IEEE 802.11 or another local area network (LAN) protocol.

The wireless transceiver module and other electronic components may be disposed on a printed circuit board (PCB). An antenna used to receive and transmit the wireless signals is typically provided as an element on the PCB or on a surface of the earbud housing, and is in communication with circuitry on the PCB.

As personal acoustic devices evolve to include smaller and lighter earbuds, the earbuds are located closer to the head of the user. As a result, the antenna may be moved closer to the ear canal or extend at least partially into the ear canal. Consequently, the ability to receive wireless signals transmitted from a remote wireless device to an earbud, or to transmit wireless signals from the earbud to the remote wireless device, can be degraded. The degradation may be due to the increased absorption and scatter from the intervening head or body of the user and/or due to de-tuning of the antenna by effective alteration of the antenna ground plane.

Various examples of a wireless personal acoustic device described below include a radio frequency (RF) antenna module in electrical communication with a wireless transceiver module to support wireless communication with a remote wireless device. The RF antenna module includes a combination of an antenna element disposed at (i.e., in or on) a housing that is remote to the earbuds and an RF coaxial cable having one end in electrical communication with the antenna element and an opposite end in communication with the wireless transceiver module in one earbud (or other type of earphone). These examples of wireless personal acoustic devices achieve improved transmission and reception performance through increased separation of the antenna module from the user's head and body relative to an antenna element limited to the location of one of the earbuds. Advantageously, as the antenna element is not present in the earbuds, the size of the earbuds can be further reduced. For example, a PCB inside an earbud can be made smaller along with the surrounding earbud housing.

FIG. 1 is an illustration of a PCB 12 disposed inside one earbud 10 of a conventional wireless personal acoustic device. The device is adapted to receive wireless signals from and/or transit wireless signals to a remote wireless device as is known in the art. The device may include one or more cables each having one or more electrical conductors to couple the earbuds to a user interface device. A wireless transceiver module 14, an antenna element 16 and various other electronics board components 18 are mounted to, formed on or otherwise attached to a PCB 12 in a region (inside dashed line) 20. The antenna element 16 is formed as a structured conductive trace, for example, by performing an etching process on the PCB. As shown, approximately 30% or more of the PCB surface area is occupied by the antenna element 16 while the region 20 that includes the wireless transceiver module 14, antenna element 16 and electronic components 18 constitutes less than 70% of the PCB surface area. In some examples, wireless transceiver module 14 and the antenna element 16 are used to transmit and receive RF signals formatted according to the Bluetooth® wireless standard.

Figure 2:
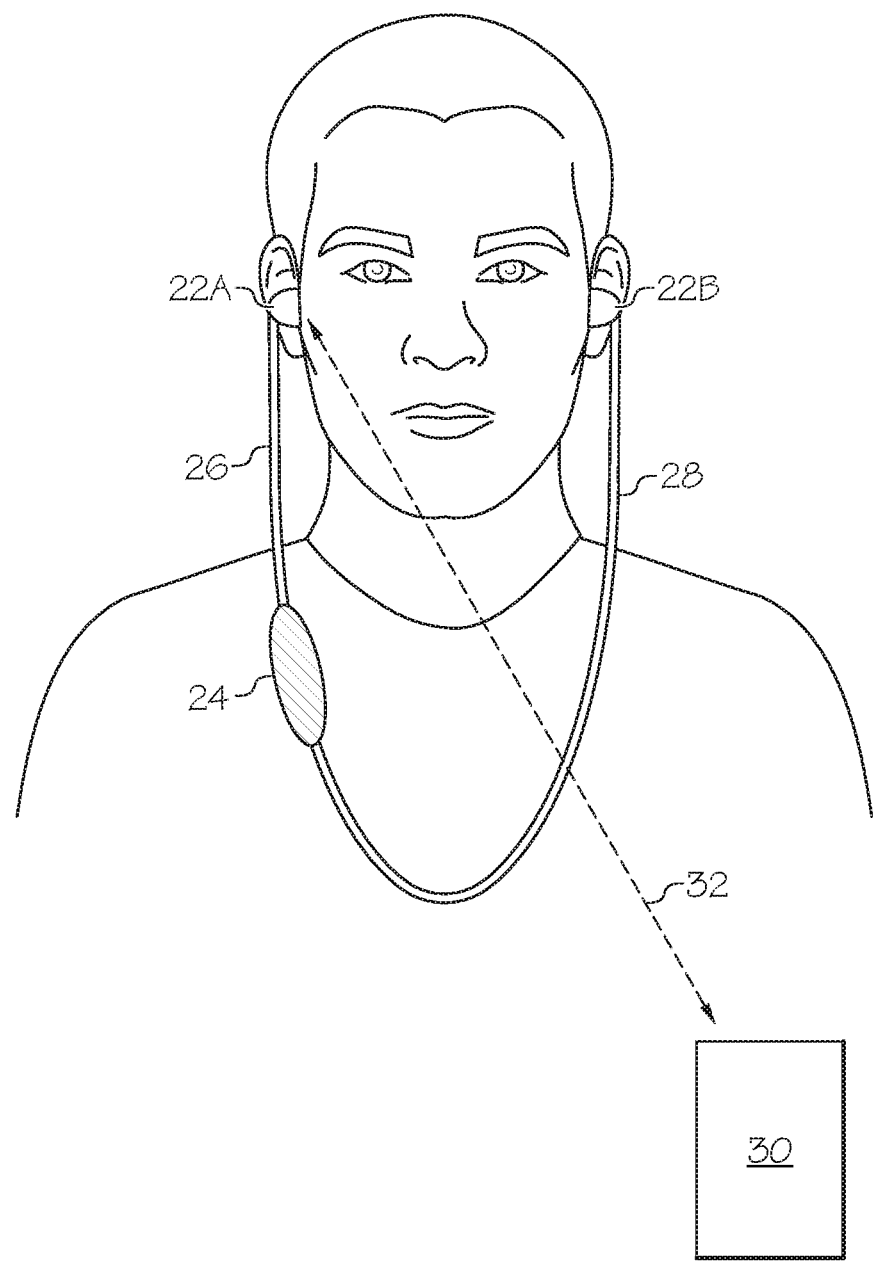
FIG. 2 is an illustration of a conventional wireless personal acoustic device worn by a user.

FIG. 2 depicts an example of a conventional wireless personal acoustic device worn by a user. The device includes a pair of earbuds 22A and 22B (generally 22) each in communication with a user interface module 24 through flexible cables 26 and 28. Although shown in front of the neck and shoulders of the user, in an alternative example the flexible cables 26 and 28 are behind the neck and shoulders. Each earbud 22 includes an acoustic transducer to convert an electrical signal into an acoustic signal. An antenna element and electronic circuitry located in one earbud 22A enables a wireless transceiver module inside the earbud 22A to communicate with a smartphone (or other type of remote wireless device 30) via a wireless communications link (dashed line) 32. The smartphone 30 may be located in a pocket of the user such that the head and body of the user prevent a direct wireless communications path. The intervening head and body may degrade the wireless transmission signals by absorption and scatter. In addition, the body may alter the ground plane of the antenna element and effectively de-tune the antenna. As a result, the wireless signals incident at the antenna element inside the earbud 22A and at an antenna element of the smartphone 30 may be reduced in power (e.g., by tens of decibels) compared to wireless signals transmitted through an unobscured wireless communications path. This negative effect is generally more pronounced as the antenna element is positioned closer to the head.

Figure 3:
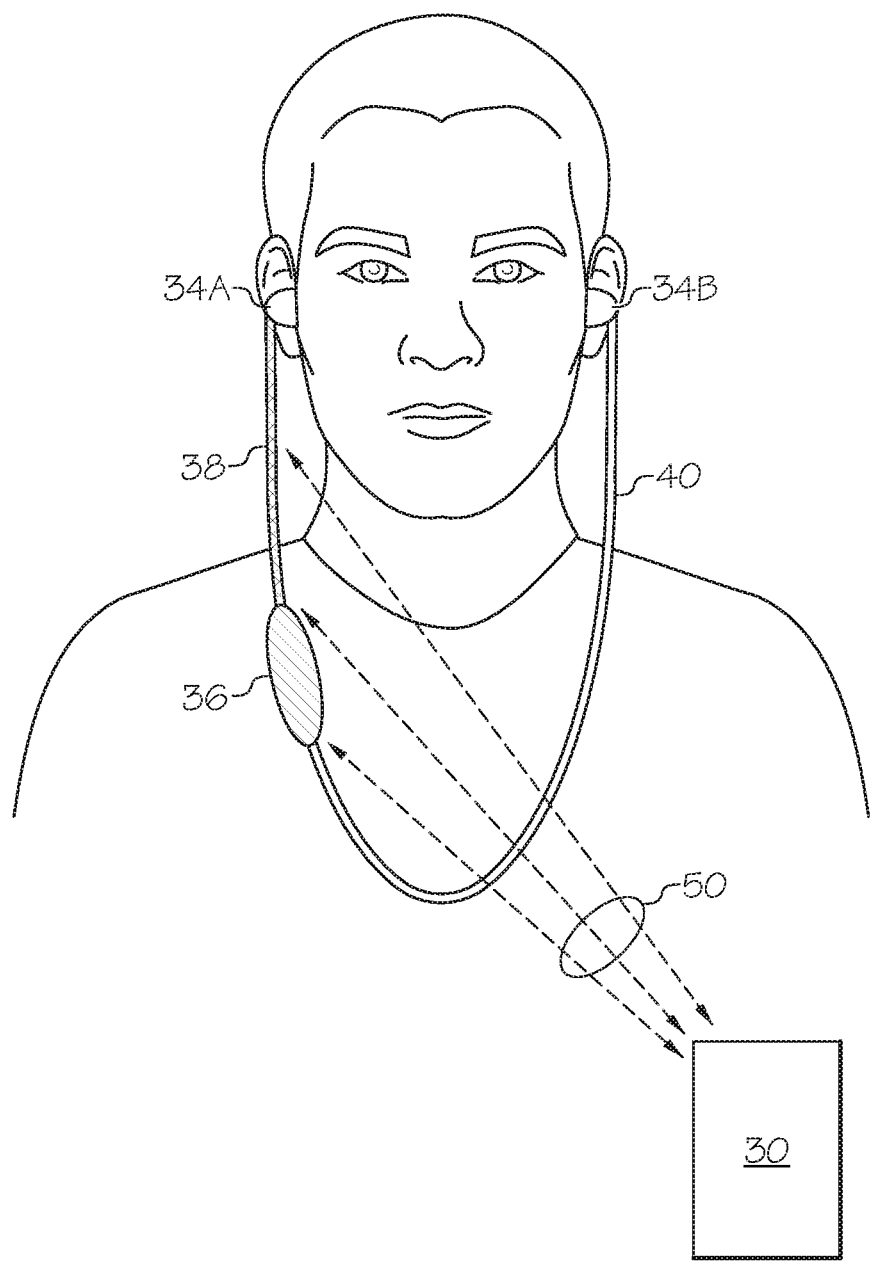
FIG. 3 is an illustration of an example of a wireless personal acoustic device having a remote coaxial antenna and worn by a user.

FIG. 3 depicts an example of a wireless personal acoustic device that allows for improved wireless communications with a remote wireless device 30 located near the user or worn or carried by the user. The wireless personal acoustic device includes a right earbud 34A and a left earbud 34B. The earbuds 34 are in electrical communication with a user interface module 36 through cables 38 and 40, respectively. The user interface module 36 includes a housing and one or more user accessible buttons to control operational features of the wireless personal acoustic device. In one example, the housing is made of plastic. Optionally, at least one button may be provided to increase or decrease the volume of an audio signal presented to the user. In addition, one or more buttons may be provided to enable the user to change an operating mode of the device. For example, a multi-function button may be provided to cause the device to be operated in a music playback mode or a voice communications mode. Alternatively, or in addition, the multi-function button may be used to answer a call, terminate a call, decline a call, place a call on hold, switch between two calls, initiate a conference call, mute or unmute a call, and/or activate voice control. The user interface module 36 may include a microphone to enable two-way voice communications and may also include a near field communication (NFC) antenna for pairing the device with another NFC capable device. The user interface features and other circuitry in the user interface module 36 are exemplary and may differ or be omitted depending on the application.

As illustrated, the right earbud 34A includes a wireless transceiver module and electronics that are in electrical communication with a remote RF antenna module (located in the user interface module 36). In one implementation, the wireless transceiver module includes a CSR8670 Bluetooth audio system on chip (SoC) available from Qualcomm® Incorporated of San Diego, Calif.

The RF antenna module includes an antenna element (not visible) disposed inside the housing of the user interface module 36 and further includes an RF coaxial conductor (not visible) that extends from the wireless transceiver module to the antenna element through the right cable 38. A wireless signal transmitted from the remote wireless device 30 through a wireless communications link (dashed lines) 50 is received at the RF coaxial conductor (inside right cable 38) and the antenna element. Conversely, a wireless signal that is transmitted from the RF coaxial cable and the antenna element is received at an antenna at the remote wireless device 30.

Figure 4:
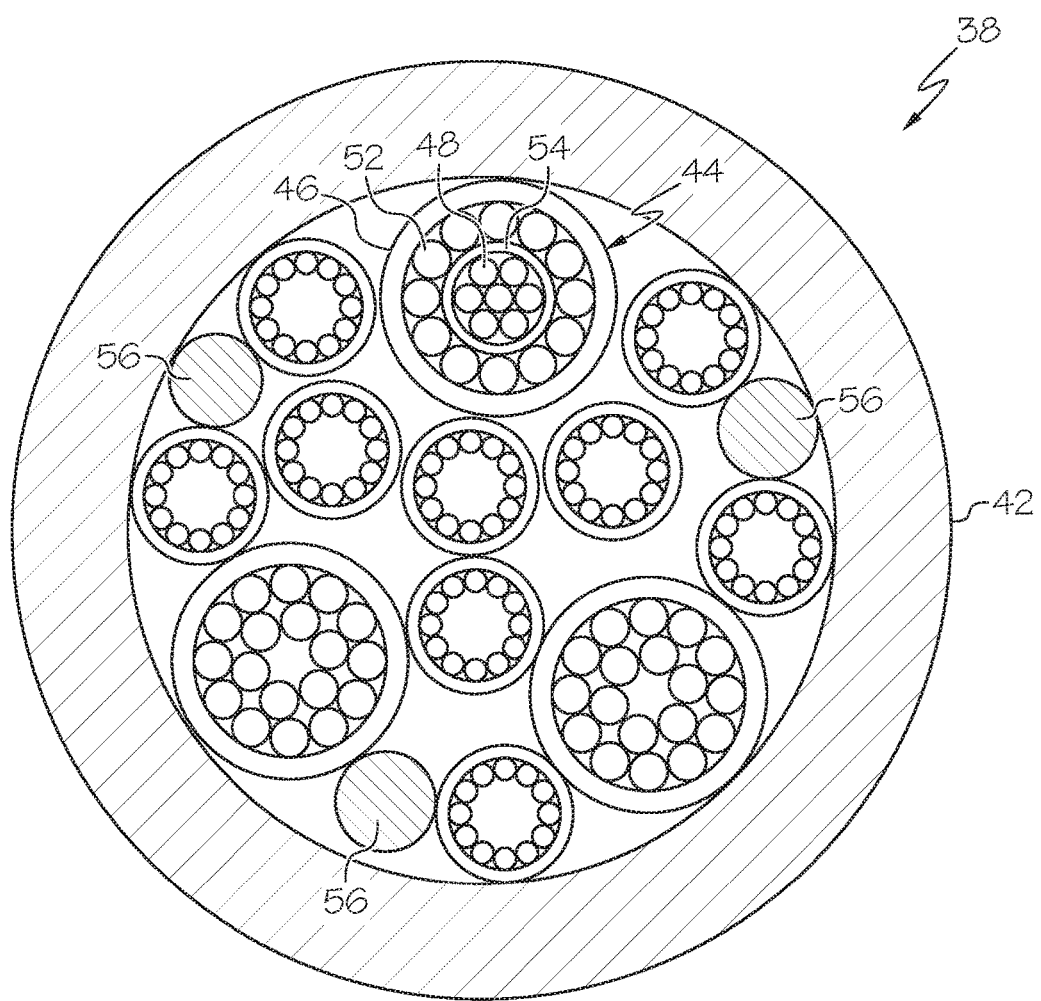
FIG. 4 is a cross-sectional view of an example of the right cable shown in FIG. 3.

FIG. 4 shows a cross-section of the right cable 38 which includes a cable jacket 42 that surrounds the RF coaxial cable 44 and other electrical conductors, such as ground wires, other coaxial cables (e.g., a microphone coaxial cable), twisted pair wires and conductors used to provide remote electrical power. The jacket 42 may also surround filler components, such as one or more Kevlar® strands 56, used to achieve a desired flexibility and cable strength. Due to the number and size of the other electrical conductors inside the right cable 38, the inclusion of the RF coaxial cable 44 does not result in a significant increase in cable diameter (e.g., one to two millimeters) as compared to the corresponding cable 26 of the conventional wireless personal acoustic device shown in FIG. 2.

The RF coaxial cable 44 includes a cable jacket 46 that surrounds multiple inner electrical conductors (e.g., wires) 48 and outer electrical conductors (e.g., wires) 52 separated by a dielectric layer 54. In addition, the RF coaxial cable 44 is preferably constructed with components to ensure naturally occurring flexing over an extended lifetime. For example, the cable 38 may be fabricated using known techniques and conductor materials to accommodate repeated bending at a small radius. In one example, the conductor material is a copper alloy. The RF coaxial cable 44 acts as a transmission line and provides substantial immunity to external noise sources, including immunity to signals associated with the other conductor inside the cable jacket 46.

Figure 5:
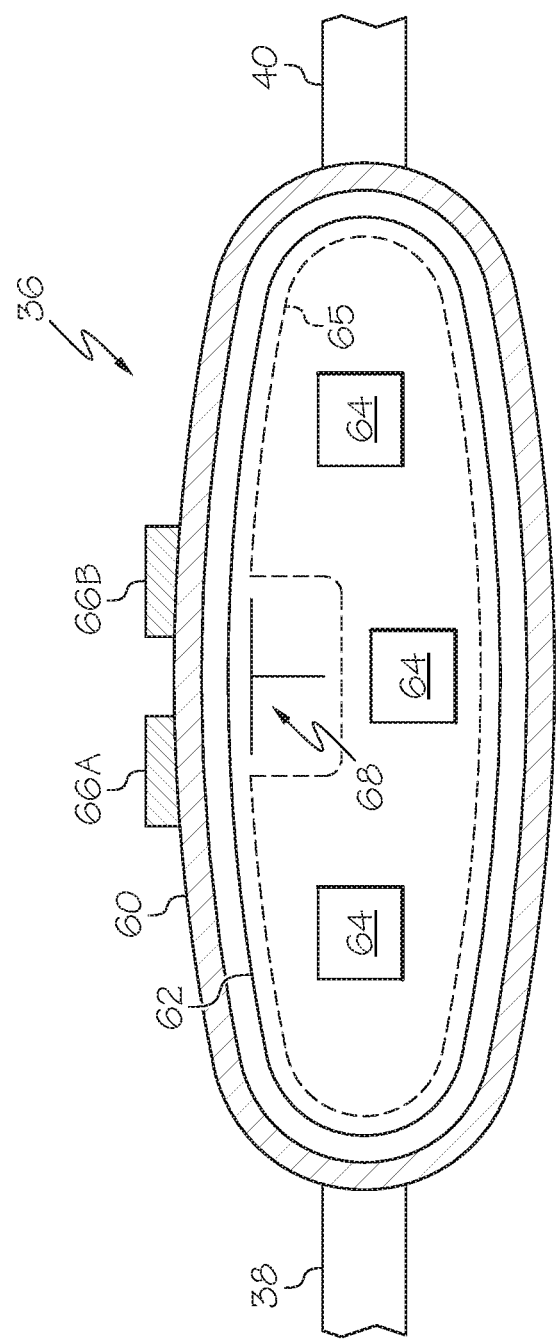
FIG. 5 shows a cutaway view of an example of the user interface module of FIG. 3.

FIG. 5 is a cutaway illustration of the user interface module 36 and shows a housing 60 that surrounds a PCB 62. The PCB 62 may be either flexible or rigid. Various electrical components 64 may be formed on or attached to the PCB 62 in the area depicted by dashed line 65, for example, to support user control of the wireless personal acoustic device, as described above. For example, operational mode control can be implemented by user activation of depressible buttons 66A and 66B in communication with some of the electrical components 64 on the PCB 62. An antenna element 68 is also shown formed on the PCB 62. Alternatively, the antenna element 68 may be formed on a second PCB such as a flexible PCB, or adhered to the housing 60. Although shown as a monopole antenna, a loop antenna or other type of antenna element as is known in the art that can be formed on or in the housing 60 can be used.

In an alternative example, the antenna element is formed on an inner or outer surface of the user interface module 36. For example, a laser direct structuring process can be used to form the surface antenna element on the surface before applying a sealant or paint to the surface.

Advantageously, the antenna module comprising the RF coaxial conductor and the antenna element 68 at the user interface module 60 results in a significant improvement in received wireless signal sensitivity and in the wireless signal strength at the remote wireless user device. The improvement is due, in part, to the relocation of the antenna element 68 into free space, that is, to a location away from the user's body and head. Further improvement is realized due to the expanded radiating and receiving area defined by the combination of the RF coaxial conductor and the antenna element. In this configuration, the body does not load the antenna module as much as a device in which the antenna element is in an earbud. In addition, the disclosed examples of a wireless personal acoustic device avoid the noise coupling that would otherwise occur between an antenna element located at an earbud and switching power supplies in the wireless transceiver module inside the earbud.

A number of examples have been described. Nevertheless, it will be understood that the foregoing description is intended to illustrate, and not to limit, the scope of the inventive concepts which are defined by the scope of the claims. Other examples are within the scope of the following claims.

What is claimed is:

1. A personal acoustic device comprising:
an earphone having an acoustic transducer;
a wireless transceiver module disposed in the earphone; and
a radio frequency (RF) antenna module in electrical communication with the wireless transceiver module, the RF antenna module comprising:
an antenna element disposed at a housing that is remote to the earphone; and
an RF coaxial conductor having a first end in electrical communication with the antenna element and a second end in electrical communication with the wireless transceiver module, wherein the RF antenna module is configured to receive a wireless signal incident at the antenna element and the RF coaxial conductor, and wherein the RF antenna module is configured to transmit a wireless signal from the antenna element and the RF coaxial conductor.

2. The personal acoustic device of claim 1 further comprising the housing with a user interface module disposed therein, the housing being disposed at the first end of the RF coaxial conductor.

3. The personal acoustic device of claim 2 wherein the antenna element is disposed inside the housing.

4. The personal acoustic device of claim 2 wherein the antenna element is disposed on a surface of the housing.

5. The personal acoustic device of claim 1 wherein the antenna element is a monopole antenna.

6. The personal acoustic device of claim 1 wherein the antenna element is a loop antenna.

7. The personal acoustic device of claim 1 wherein the antenna element is formed on a printed circuit board.

8. The personal acoustic device of claim 7 wherein the printed circuit board is a flexible printed circuit board.

9. The personal acoustic device of claim 1 wherein the earphone comprises an earbud configured for insertion into an ear canal of a user.

10. The personal acoustic device of claim 1 wherein the wireless transceiver module is a Bluetooth transceiver module.

11. The personal acoustic device of claim 2 further comprising a cable extending between the housing and the earphone, the cable having a jacket enclosing at least one electrical conductor and the RF coaxial conductor.

12. The personal acoustic device of claim 11 wherein the at least one electrical conductor includes at least one of a power conductor, a ground conductor, a microphone coaxial conductor and a twisted pair conductor.

13. A personal acoustic system comprising:
an earphone having an acoustic transducer;
a wireless transceiver module disposed in the earphone;

a radio frequency (RF) antenna module in electrical communication with the wireless transceiver module, the RF antenna module comprising:
  an antenna element disposed at a housing that is remote to the earphone; and
  an RF coaxial conductor having a first end in electrical communication with the antenna element and a second end in electrical communication with the wireless transceiver module, wherein the RF antenna module is configured to receive a wireless signal incident at the antenna element and the RF coaxial conductor, and wherein the RF antenna module is configured to transmit a wireless signal from the antenna element and the RF coaxial conductor; and
an audio source device configured for wireless communication with the wireless transceiver module.

14. The personal acoustic system of claim 13 wherein the audio source is one of a cellular telephone, smartphone, tablet, personal computer and music playback device.

15. The personal acoustic system of claim 13 further comprising the housing with a user interface module disposed therein, the housing being disposed at the first end of the RF coaxial conductor.

16. The personal acoustic system of claim 15 wherein the antenna element is disposed inside the housing.

17. The personal acoustic system of claim 15 wherein the antenna element is disposed on a surface of the housing.

18. The personal acoustic system of claim 15 further comprising a cable extending between the housing and the earbud, the cable having a jacket enclosing at least one electrical conductor and the RF coaxial conductor.

* * * * *